United States Patent [19]

Birnbach et al.

[11] Patent Number: 4,647,154
[45] Date of Patent: Mar. 3, 1987

[54] OPTICAL IMAGE PROCESSOR

[75] Inventors: Curtis Birnbach, Bronx; Jay Tanner, Nesconset, both of N.Y.

[73] Assignee: Quantum Diagnostics Ltd., Hauppauge, N.Y.

[21] Appl. No.: 518,690

[22] Filed: Jul. 29, 1983

[51] Int. Cl.$^4$ .................. G02B 27/42; G02B 27/46; G01B 9/02; G06G 9/00

[52] U.S. Cl. ..................... 350/162.12; 364/822; 356/345

[58] Field of Search ............. 350/162.11, 162.12, 350/162.13, 162.14, 162.19, 376, 377, 384; 356/351, 345; 364/822, 826

[56] References Cited

U.S. PATENT DOCUMENTS

| | | |
|---|---|---|
| 3,085,469 | 4/1963 | Carlson .................. 355/37 |
| 3,418,626 | 12/1968 | Farr et al. . |
| 3,427,586 | 2/1969 | Lohmann et al. . |
| 3,453,048 | 7/1969 | Williams . |
| 3,497,287 | 2/1970 | Lang . |
| 3,519,992 | 7/1970 | Rau . |
| 3,524,706 | 8/1970 | Farr . |
| 3,604,778 | 9/1971 | Burckhartt . |
| 3,630,596 | 12/1971 | Watkins . |
| 3,634,695 | 1/1972 | Barringer . |
| 3,650,595 | 3/1972 | Gerritsen et al. . |
| 3,675,983 | 7/1972 | La Macchia . |
| 3,677,616 | 7/1972 | Lewis . |
| 3,704,931 | 12/1972 | Mueller . |
| 3,719,127 | 3/1973 | Mueller . |
| 3,744,870 | 7/1973 | Tomiki et al. . |
| 3,744,879 | 7/1973 | Beard et al. . |
| 3,749,489 | 7/1973 | Parrent, Jr. . |
| 3,754,814 | 8/1973 | Leith . |
| 3,770,340 | 11/1973 | Cronin et al. . |
| 3,829,832 | 8/1974 | Kawasaki . |
| 3,869,697 | 3/1975 | Kawasaki . |
| 3,872,293 | 3/1975 | Green . |
| 3,877,776 | 4/1975 | Okino et al. . |
| 3,882,456 | 5/1975 | Takada . |
| 3,884,546 | 5/1975 | Chu . |
| 3,884,553 | 5/1975 | Graser, Jr. . |
| 3,885,143 | 5/1975 | Ishii . |
| 3,891,968 | 6/1975 | McMahon . |
| 3,905,019 | 9/1975 | Aoki et al. . |
| 3,950,747 | 4/1976 | Waddoups . |
| 3,977,771 | 8/1976 | Horner . |
| 3,981,562 | 9/1976 | Anthon . |
| 3,993,976 | 11/1976 | Ginsburg . |

List Continued on next page.

OTHER PUBLICATIONS

"New Module Splits Laser Beams", *Aviation Week & Space Technology*, 21—Oct.—63, pp. 95-97.
Florence et al, "Feature Enhancement Using Noncoherent Optical Processing", SPIE, vol. 201, pp. 95-99, 1971.
Van Nostrand's Scientific Encyclopedia, Fourth Ed., Princeton, N.J., p. 380.
Rhodes, "Acousto—Optic Signal Processing: Convolution and Correlation", IEEE, vol. 69, No. 1, 1—1981, pp. 65-78.

*Primary Examiner*—Bruce Y. Arnold
*Assistant Examiner*—David J. Edmondson
*Attorney, Agent, or Firm*—Ostrolenk, Faber, Gerb & Soffen

[57] ABSTRACT

An optical processing system based on noncoherent light processing employs both geometrical and diffraction optical systems. One portion of the optical system performs a subtraction operation of the image from itself where one of the subtracted images is relatively defocused and one is delayed in time from the other. The subtracted image is edge-enhanced and then applied to a spatial filter employing an interferometer in which spatial filters are contained in the interferometer iris plates. Additional spatial filtering is performed on the interference image and the processed image is displayed in an appropriate display which can selectively view the processed image, the unprocessed image or combinations of the two. Light storage elements are employed for storing the processed images in appropriate buffers over a given length of time. The buffers are read out by a flashlamp. Suitable shutters are closed during the readout process.

17 Claims, 3 Drawing Figures

U.S. PATENT DOCUMENTS

| | | |
|---|---|---|
| 4,025,195 | 5/1977 | Ebersole et al. ............... 356/71 |
| 4,035,062 | 7/1977 | Fletcher et al. . |
| 4,037,918 | 7/1977 | Kato . |
| 4,063,799 | 12/1977 | Bernstein et al. . |
| 4,067,645 | 1/1978 | Carlson et al. . |
| 4,081,673 | 3/1978 | Swindell et al. . |
| 4,082,429 | 4/1978 | Ward, III et al. . |
| 4,089,589 | 5/1978 | Brockman et al. . |
| 4,097,749 | 6/1978 | Gardner . |
| 4,110,004 | 8/1978 | Bocker . |
| 4,118,099 | 10/1978 | Weiss et al. . |
| 4,130,348 | 12/1978 | Minami . |
| 4,153,336 | 5/1979 | Minami et al. . |
| 4,174,885 | 11/1979 | Joseph et al. . |
| 4,183,623 | 1/1980 | Haines . |
| 4,188,122 | 2/1980 | Massie et al. ............... 356/351 |
| 4,198,125 | 4/1980 | Tatian et al. . |
| 4,207,370 | 6/1980 | Liu . |
| 4,225,938 | 9/1980 | Turpin . |
| 4,271,413 | 6/1981 | Shreve . |
| 4,357,676 | 11/1982 | Brown . |
| 4,453,804 | 6/1984 | Evans ............... 350/162.12 |

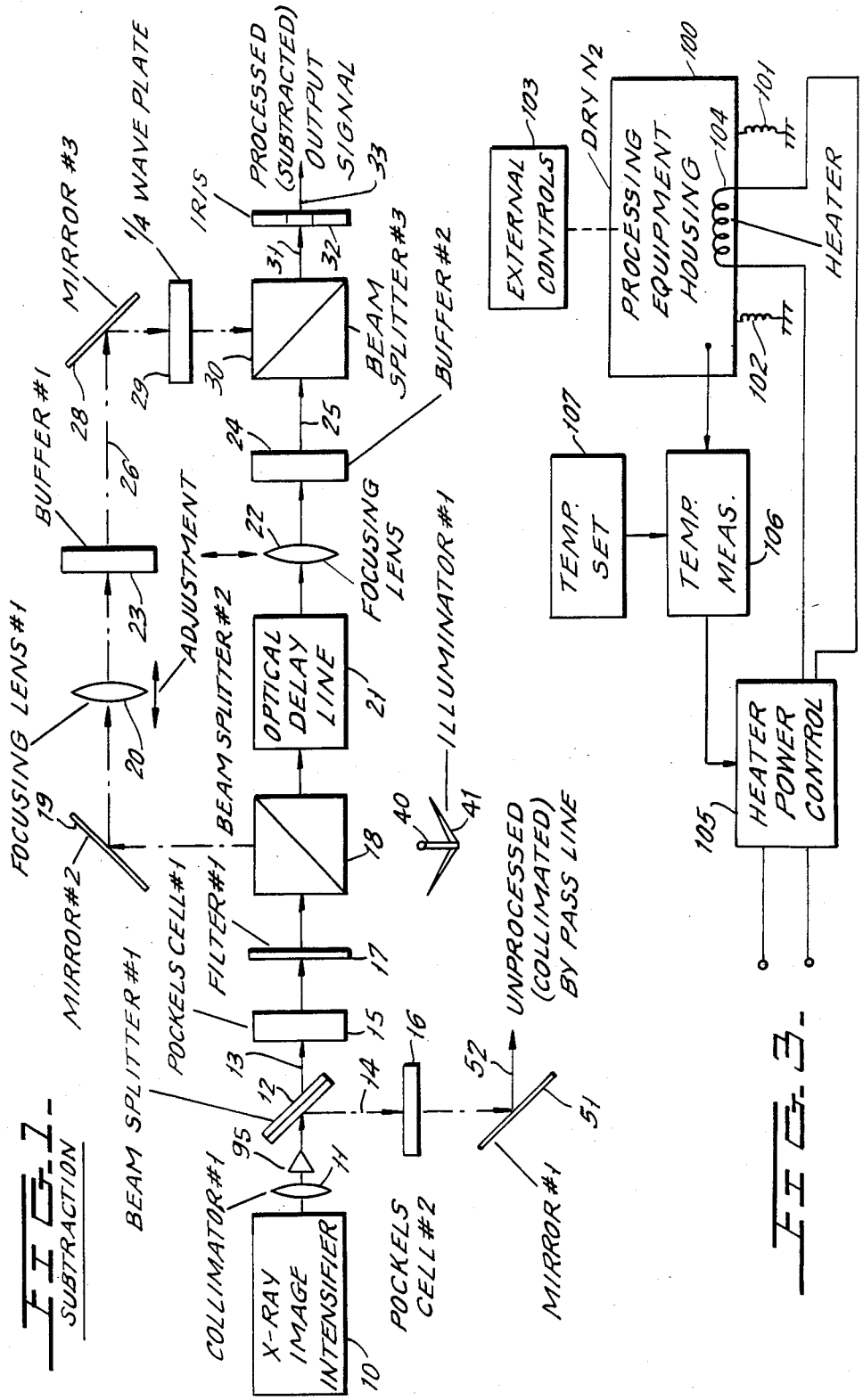

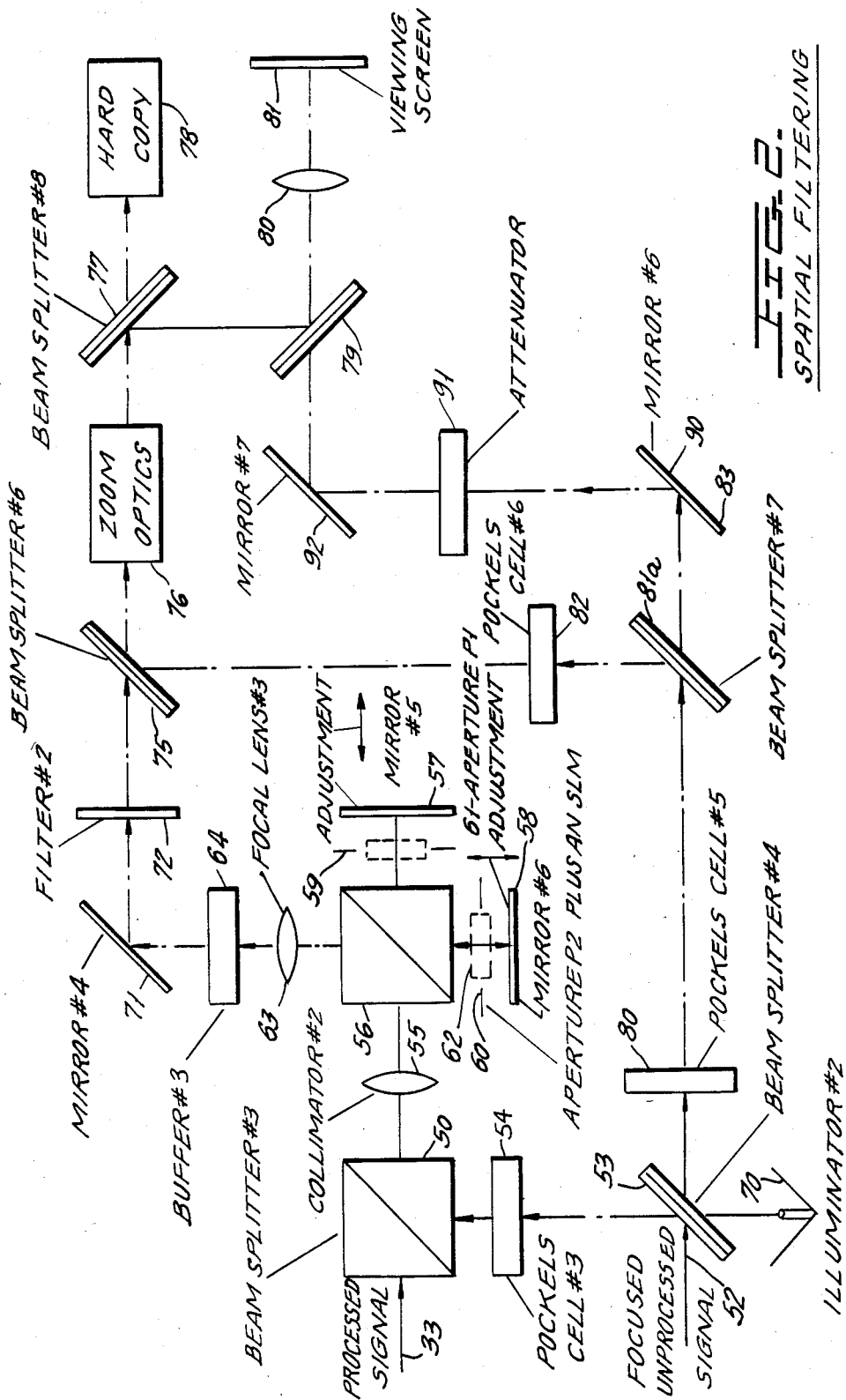

OPTICAL IMAGE PROCESSOR

BACKGROUND OF THE INVENTION

This invention relates to image processing, and more particularly relates to a novel optical image processor having particular application to the processing of X-ray images.

Image processors for medical X-ray images and the like are well known. Such image processors employ digital techniques to manipulate images.

Digital techniques are used in systems which employ digital computers for processing the received data. Typically, a video camera scans the output phosphor screen of an X-ray image intensifier and the output is digitized, and applied to a computer which performs varous manipulations on the data. Transparencies and other forms of input information can also be analyzed by the video camera.

Digital radiography equipment of this type is slow, is bandwidth-limited and has low spatial resolution and poor contrast detectability. Consequently, patients have to be exposed to fairly large doses of X-rays to employ this type of image processing.

Improved digital systems are available which have been developed principally for military reconnaissance applications and are characterized by moderate data through-put which might be equal to or greater than about 100 megabits per second and have the ability to implement advanced processing techniques including subtraction, convolution, correlation, etc. in real time or near real time. Even these digital signal processors have limitations, however, in that they are generally constrained to spatial resolutions of less than about 3 line pairs per millimeter. This is due to a combination of the limiting spatial resolution of the X-ray image intensifier and of the matrix size which is generally about 512×512 pixels. Further limitations exist on the quality of the end product image due to the television cameras used to image the output phosphor of the X-ray screen or image.

As the signal processing quality of digital signal processors is increased (that is, as the size of the matrix used is increased), the number of steps of gray to be manipulated is increased, the through-put is increased and the processing electronics becomes more complex. The equipment reaches a point where cost, maintenance, downtime, repair and environmental considerations become a serious problem in addition to the high initial cost of the equipment.

Optical image processing avoids many of the problems of digital signal processing at only a small fraction of the cost of the digital system. Conventional optical data processing equipment employs the properties and interactions which occur when light travels through a refracting medium. Various signal processing techniques can be used including convolution, correlation, image transformation, edge enhancement, deblurring and noise reduction among others.

Optical data processing systems generally employ operations on either coherent light or noncoherent light. The processing of coherent optical data streams offers a number of capabilities, principally the ability to perform a fourier transform in real time. This occurs when the coherent beam passes through a lens. Various types of spatial filters can be placed at the fourier plane of this lens. Such filters are capable of implementing various signal processing functions. The data stream is then subjected to an inverse fourier transform by a second lens. The resulting output image plane contains the enhanced data set.

Coherent optical data processing has certain limitations. These include a relatively small dynamic range and a noise problem known as "laser speckle" which is a snow-like noise image overlaid on the main image under certain circumstances. A second problem in coherent optical data processing is that the X-ray data which is initially input into the processor is incoherent so that appropriate transformation must be made prior to processing.

Noncoherent optical data processing is also known and is capable of performing noise reduction, feature enhancement, correlation, subtraction, level splicing among other data processing operations. Such processors offer a wide dynamic range and have a high signal-to-noise ratio with full two-dimensional parallel processing in real time of the data stream.

Noncoherent optical data processing techniques are based on two principles: geometric optical systems and diffraction optical systems. Each has its own advantages and disadvantages which are well known. Geometric optical systems employ shadow techniques which modify the optical data stream. Diffraction optics rely only on the interaction and diffraction of light waves to perform enhancement techniques.

The present invention provides a novel assemblage of optical components which integrates geometric optical techniques with diffraction techniques for a noncoherent optical data processor.

SUMMARY OF THE PRESENT INVENTION

A novel assemblage of optical components is provided in accordance with the present invention to perform improved and relatively inexpensive image processing for an image which can be derived from any source, for example, an X-ray image intensifier. The novel assembly of the invention can perform most operations currently implemented by existing optical data processors and by existing digital radiography systems including:

(a) Fourier domain processing;
(b) Two-dimensional spatial filtering;
(c) Edge enhancement;
(d) Noise reduction;
(e) Real time subtraction;
(f) Convolution;
(g) Level splicing;
(h) Intensity transformation.

All of the above operations are accomplished in real time on high resolution medical X-rays or other imagery. The device of the invention is capable of operating with the following specifications:

(a) Spatial resolution: 100 line pairs per millimeter;
(b) Dynamic range: in excess of 60 db;
(c) Contrast range: 5000:1;
(d) Bandwidth: 1 gigahertz;
(e) Frame rate: 30 frames per second in all formats with higher speeds possible.

Among other features of the invention, there is provided a novel subtraction technique wherein the same image is divided into two paths, both of which have processing devices, and the images in the two paths are subtracted. This subtraction technique is to be contrasted, for example, to the subtraction of the image of the first transparency from the image of the second transparency as is common. By subtracting the image from itself, at least edge enhancement processing is obtained in the processed image. In the subtraction system, there is also a novel arrangement for obtaining convolution by alteration of the length of the subtraction paths.

A novel switching arrangement is provided in which optical paths can be selectively turned on and off to perform various image processing operations on the image applied to the system, such as only subtraction or only spatial filtering or both.

A novel system is provided for the storage of optical information in a buffer, such as a prom or the like. The purpose of the buffers is to permit storage of information from a weak source over a given period of time. Thereafter, the image stored in the buffers is read out through the flash beam. Note that the flash sends an intense beam through the entire system in order to preserve the signal-to-noise ratio of a noncoherent system while still obtaining the desired intense output normally available in a coherent system.

As a further feature of the invention, a novel spatial filter interferometer structure is provided in which spatial light modulators are contained in conventional apertures at each side of a conventional interferometer. In addition, a novel third geometric filter is provided in the spatial filtering system output path which follows the diffraction type spatial light modulators which are contained in the interferometer apertures. The spatial filter system enhances contrast. Note in prior art systems a pinhole or single, fixed aperture was provided in each leg of the system to limit spatial frequency in each leg and thus create bandpass filtration.

As a further novel feature of the present invention, means are provided for combining unprocessed and processed data in selected proportions so that the observer can mix processed and unprocessed data as desired.

A still further feature of the present invention involves the novel arrangement for packaging the overall assembly. Thus, optical processing systems are sensitive to dimensional change due to temperature variation. In accordance with one feature of the present invention, temperature drifts are avoided by intentionally heating the assembly to a given temperature above the highest expected ambient temperature. The input power to the heater is then regulated to maintain a constant assembly temperature regardless of generation of more or less heat within the assembly or fluctuation of ambient temperature.

All optical components are mounted within a hermetically sealed enclosure filled, for example, with dry nitrogen gas to eliminate the need to clean the optical system. Moreover, the entire housing may be mounted in a suitable shock-mounting to prevent inadvertent relative movement of the optical components due to shock.

All adjustments to equipment within the housing can be made from regions external of the housing, with manual adjustments, for example, employing a flexible control cable or the like which enters the housing, or employing electrical drive motors within the enclosure, controlled by electrical apparatus disposed externally of the housing.

BRIEF DESCRIPTION OF THE DRAWINGS

FIG. 1 schematically illustrates the optical components which are at the optical input system and which are involved in the subtraction function of the equipment.

FIG. 2 shows the spatial filtering portion of the system and is a continuation of FIG. 1.

FIG. 3 schematically illustrates the novel housing of the invention along with its shock-mounting and heater control.

DETAILED DESCRIPTION OF THE INVENTION

FIG. 1 shows the subtraction optics used for the system of the invention, while FIG. 2 shows the spatial filtering optics for the system. A bypass line for unprocessed data from the subtraction system to the spatial filtering system and the processed signal output of the subtraction system of FIG. 1 lead directly into the left-hand side of the spatial filtering arrangement of FIG. 2.

The system shows in FIGS. 1 and 2 employs non-coherent light for processing as contrasted to a coherent light processor. A typical source for a noncoherent light input which is to be processed can be the screen of the X-ray image intensifier 10 of FIG. 1. A significant feature of the invention is that the input light is a modulated source, rather than a transparency, as in the prior art. However, the present invention can also operate on input data from an appropriately illuminated transparency or the like.

The two-dimensional image of the X-ray image intensifier face is applied toward an appropriate collimating lens 11 to beam splitter 12 which divides the collimated light from collimating lens 11 into paths 13 and 14, respectively. If desired, a fiber optic cable can be used to couple the modulated source image to the collimating lens 11 and splitter 12. Paths 13 and 14 contain respective light switching devices illustrated as Pockels cells 15 and 16, respectively. Pockels cells 15 and 16, and the others described hereinafter, can be replaced by any other type of electro-optical shutter or mechanical shutter.

The image of X-ray intensifier 10 which passes through Pockels cell 15 is applied through a spectral filter 17 to a beam splitter 18. The input light to the beam splitter 18 then divides into two paths, the first including reflecting mirror 19 and focusing lens 20 and the second including a suitable optical delay line 21 and a focusing lens 22. The image focused by lens 20 is applied to buffer 23 and the image focused by lens 22 is focused onto the buffer 24. Buffers 23 and 24 as well as other buffers to be described hereinafter may be of any desired image storing device and can consist of conventional proms or liquid crystal light valves (LCLVs) of known structure. Buffers of this type are mainly used in coherent systems but are used in a novel manner in the present system as will be described.

The output light of buffers 23 and 24 follows paths 25 and 26, respectively. The light in path 26 is reflected by an appropriate mirror 28 and is applied through a ¼ wave path 29 to one side of a conventional beam splitter 30. The light from path 25 is also applied to the beam splitter 30 and the light of paths 25 and 26 is combined by the beam splitter 30 to produce an image subtraction operation. The ¼ wave plate 29 is used to adjust the polarized nature of the light in the two paths.

Buffers 23 and 24 can be replaced by a single buffer at the output of beam splitter 30. This is desirable to assist in keeping the optical properties of the two paths in the subtraction system as close to one another as psosible.

The output subtracted light 31 is then passed through an iris diaphragm 32 which acts as a light level control device and acts to sharpen the edges in the processed image. The processed and subtracted output signal 33 is then applied to the input side of the spatial filtering arrangement of FIG. 2 as will be later described.

In the subtraction path of FIG. 1, one of the focusing lenses, for example, lens 20, is adjusted to intentionally slightly blur the image focused on the buffer 23. By blurring this part of the image, there is produced a convolution effect similar in nature to the technique known as "blurred or unsharp masking" which is used in photographic processing. Note, however, that the implementation of this technique in the optical arrangement of FIG. 1 is unique.

An important and unique feature in the arrangement of FIG. 1 is that the images in buffers 23 and 24 are the real time images of exactly the same scene on the X-ray image intensifier 10 and these identical images are subtracted from one another. This is distinct from subtraction techniques which have been used in the past in which the images of two different transparencies or two different time scenes are subtracted from one another.

Also shown in FIG. 1 is a high intensity flash illuminator which consists of a strong flashlamp 40 which directs its illumination onto the beam splitter 18 when it is desired to read out buffers 23 and 24. At the time the illuminator lamp 40 is flashed (which flash is focused by the mirror 41 onto the beam splitter 18), the switches or Pockels cells 15 and 16 are closed. Similarly, other shutters and Pockels cells which are to be later described are closed during this readout time.

The output or processed signal of the subtract system of FIG. 1, as pointed out above, is applied to the input of the system portion shown in FIG. 2. Thus, the processed signal 33 is applied to beam splitter 50 in FIG. 2 which is operable to combine the processed signal 33 with the focused, unprocessed signal which is taken directly from the X-ray image intensifier. Thus, in FIG. 1 the unprocessed and collimated light from intensifier 10 has been applied by the beam splitter 12 through the Pockels cell 16 to mirror 51. The unprocessed light, shown by the ray 52, is then applied to the beam splitter 53 in FIG. 2 and is applied through the Pockels cell 54 to the beam splitter 50 so that processed and unprocessed images can be combined in the beam splitter 50 when the Pockels cells 54 is opened.

Processed and unprocessed light or the processed light combined with the unprocessed light is then applied from the beam splitter 50 to the collimator lens 55. The output light of collimator 55 is then applied to the interferometer consisting of beam slitter 56, reflecting mirrors 57 and 58 and aperture plates 59 and 60 associated with mirrors 57 and 58, respectively.

The interferometer, consisting of components 56 through 60, is known for spatial filtering purposes and optical processing systems. In accordance with the invention, however, the apertures in plates 59 and 60 contain spatial light modulators 61 and 62, respectively, to enable spatial filtering or modulating of the output signal of the interferometer which is ultimately applied through the focal lens 63 to the buffer 64. Modulators 61 and 62 may be any desired optical device such as a filter, grating, diaphragm, SLM or other device which can impose an appropriate function on the light beam passing therethrough.

The information in buffer 64 can be read when desired through the use of illuminator 70, with the Pockels cell 54 opened and other Pockels cells in the system appropriately closed as is necessary.

The output of the buffer 64 which is filtered or otherwise processed by the spatial light modulators 61 and 62 is then further processed in an appropriate manner after reflection from mirror 71 by the filter 72. The filter 72 is normally used in geometric systems but its use with the diffraction type filter including the spatial light modulators 61 and 62 is a novel combination of both geometric and physical optics in an optical processor.

The light which is processed by the filter 72 is then applied through the beam splitter 75 to appropriate zoom type optics 76, if desired, and then through a beam splitter 77 to either a hard copy-making apparatus 78 or by reflection from beam splitter 79 and through focal system 80 to a viewing screen 81.

The bypass channel shown in FIG. 2 for the unprocessed signal includes the Pockels cell 80 and beam splitter 81a. Light from beam splitter 81a takes the path through the Pockels cell 82 and the path to the reflecting mirror 83. When passing through the Pockels cell 82, the unprocessed light is combined with the processed light at the beam splitter 79 and can be presented to the diagnostician with any mix of processed and unprocessed light which he may select. The unprocessed light which passes directly through beam splitter 81a is reflected by the mirror 90 and is directed through an appropriate attenuator 91 to reflecting mirror 92. From the reflecting mirror 92, the unprocessed light is applied through the beam splitter 79 and the lens 80 to the viewing screen 81 to permit viewing of the unprocessed signal alone or in combination with the processed signal. The attenuator permits the application of whatever amount of unprocessed light is desired by the diagnostician.

In the novel arrangement of the invention, as set forth in FIGS. 1 and 2, it will be apparent that by appropriately turning on and off the various Pockels cells and by appropriate adjustment of attenuator 91, it becomes possible to excite the illuminators 40 and 70 and to turn on and off appropriate Pockels cells in order to read out the stored and processed image of the X-ray image intensifier 10 either on a viewing screen 81 or in the hard copy apparatus 78.

The observed signal will have either or both subtraction modification or spatial filtering modification or the like through the novel combination of geometric and physical optical systems and either the processed signal or unprocessed signal can be displayed or the signal displayed can include any desired proportion of processed and unprocessed signals.

The optical equipment shown in FIGS. 1 and 2 is also provided with appropriate mechanical adjustments which are indicated, for example, by the double-ended arrows. Thus, components 20, 22, 57 and 58 which are capable of mechanical adjustment can be adjusted by the turning of a mechanical screw or through a motorized system.

Stages of image intensification can be added to the system where needed. For example, an image intensifier 95 can be connected in front of splitter 12 (FIG. 1). Other image intensifiers (not shown) can be connected between components 30 and 32 and between components 76 and 77 (FIG. 2).

Note that two basic signal paths are provided in FIGS. 1 and 2. A third signal path can be added, if desired, to perform further processing on the applied input signal, if desired.

FIG. 3 schematically illustrates a hermetically sealed housing 100 for housing the optical components of FIGS. 1 and 2 and for fixing the components relative to one another as needed. The housing is preferably filled with a gas such as dry nitrogen to eliminate the need for cleaning the optical elements. Appropriate input and output hoods (not shown) are also provided.

The entire housing is preferably mounted on shock supports, schematically illustrated as spring mounts 101 and 102, and has external controls 103 at which manually and electrically available controls are provided to enable control of the position of lenses and other components within the housing 100. The external controls 103 can be coupled to the components within the housing 100 through conventional hermetically sealed cable arrangements. Adjustment motors within housing 100 can also be operated by electrical signals produced by appropriate circuitry in the control housing 103.

Since the various optical components may vary in spacing due to temperature change to affect the adjustment of the system, the housing is provided with an internal heater element 104 which is energized from an appropriate a.c. source through a heater power control system 105. Heater 104 is operated to intentionally heat the housing and its contents to a temperature higher than that which the ambient can be expected to reach. An appropriate temperature measurement probe, which may consist of one or more probes distributed about the interior of housing 100, is then connected to a temperature measuring circuit 106. Circuit 106 has a second input 107 from a temperature set reference source which can be manually set to a value related to some desired constant temperature for the interior of the housing 100 which is above the highest ambient temperature which is expected to be reached.

The output of the temperature measurement device 106 is then connected to the heater power control system 105 and consists of an error signal produced when the output of the temperature measurement within housing 100 varies from the set temperature input from the input reference source 107. Consequently, it becomes possible to increase or decrease the power applied to the heater 104 in order to maintain the temperature within housing 100 constant regardless of changes in ambient temperature or in changes of the heat produced within the housing by the system components.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An optical image processor for processing non-coherent light, comprising:
    a collimated, two-dimensional image beam source of non-coherent light;
    first beam splitter means for dividing the image beam from said image beam source into first and second beam paths;
    an optical delay line in said second beam path;
    second beam splitter means for combining the image beams in said first and second beam paths, causing said image beams to destructively interfere with each other and thereby produce a subtracted output image beam; and
    first and second focusing lenses in said first and second paths for producing generally focused images at said second beam splitter means, said first focusing lens being intentionally defocused relative to said second focusing lens.

2. The image processor of claim 1 which further includes an iris disposed in the path of said subtracted output image.

3. The image processor of claim 1 which further includes first and second buffers in said first and second paths to store said image beams and high intensity illuminator means arranged to illuminate said first and second buffers to read out the stored images in said first and second buffers.

4. The image processor of claim 3 which includes a ¼ wave plate disposed in said first path between said first buffer and said second beam splitter means.

5. The image processor of claim 3 which further includes a third beam splitter means disposed between said collimated image source and said first beam splitter means for directing an image of the unprocessed light of said collimated image source along a third path; and further including first and second optical switches disposed respectively in said third path and in the path between said third and first beam splitter means; and means for controlling said optical switches such that said switches are closed and pass no light when said illuminator means is energized.

6. The image processor of claim 5 which further includes optical means for selectively combining together and displaying said light in said third path and said subtracted output image.

7. The image processor of claim 5 which further includes an interferometer disposed in the path of said subtracted output image for spatially filtering said subtracted output image and third buffer means disposed in the output of said interferometer.

8. The image processor of claim 7 wherein said interferometer comprises:
    an inteferometer comprising an interferometer beam splitter, first and second reflecting mirrors disposed relative to said beam splitter to cause interference between reflected portions of said collimated image source, first and second aperture plates respectively disposed between said interferometer beam splitter and said first and second reflecting mirrors, and first and second light modulators disposed in said first and second aperture plates; said interferometer producing an output image beam,
    a spatial filter disposed in the path of said output image beam, and
    output image means for observing the spatially filtered image beam.

9. The image processor as set forth in claim 7 which further includes a fourth beam splitter means; said fourth beam splitter means receiving said light image from said third path and receiving said subtracted output image, combining these images and directing said combined images toward said interferometer.

10. The image processor of claim 9 which further includes an iris disposed in the path of said subtracted output image.

11. The image processor of claim 10 which further includes a ¼ wave plate disposed in said first path.

12. The image processor of claim 1 which further includes an interferometer disposed in the path of said subtracted output image for spatially filtering said subtracted output image.

13. The image processor of claim 12 wherein said interferometer comprises:

an interferometer comprising an interferometer beam splitter, first and second reflecting mirrors disposed relative to said interferometer beam splitter to cause interference between reflected portions of said collimated image source, first and second aperture plates disposed between said interferometer beam splitter and said first and second reflecting mirrors; and first and second light modulators respectively disposed in said first and second aperture plates; said interferometer producing an output image beam;

a spatial filter disposed in the path of said output image beam for producing a spatially filtered image beam, and output image means for observing the spatially filtered image beam.

14. An optical image processor for processing non-coherent light comprising:

a collimating image beam source, an interferometer comprising an interferometer beam splitter, first and second reflecting mirrors disposed relative to said interferometer beam splitter to cause interference between reflected portions of said collimated image source, first and second aperture plates disposed between said interferometer beam splitter and said first and second reflecting mirrors, and first and second light modulators disposed in said first and second aperture plates; said interferometer producing an output image beam;

a spatial filter disposed in the path of said output image beam; and output imaging means for displaing the spatially filtered image beam.

15. The optical image processor of claim 1, 14, or 13 which further includes a housing for the optical components of said processor; heater means disposed in said housing for heating the interior of said housing to a temperture higher than ambient temperature; and control means operatively connected to said heater means for maintaining constant the temperature within said housing by controllably increasing and reducing the power applied to said heater means.

16. The processor of claim 15 wherein said housing is hermetically sealed and is filled with a dry inert gas.

17. The processor of claim 16 wherein said housing is mounted to be relatively unaffected by ambient shocks.

* * * * *